(12) United States Patent
Gonzaga

(10) Patent No.: US 6,422,285 B1
(45) Date of Patent: Jul. 23, 2002

(54) TIRE CHANGING MACHINE FOR INDUSTRIAL VEHICLE WHEELS

(75) Inventor: Tullio Gonzaga, Correggio (IT)

(73) Assignee: Butler Engineering & Marketing S.r.l., Rio Saliceto (IT)

(*) Notice: Subject to any disclaimer, the term of this patent is extended or adjusted under 35 U.S.C. 154(b) by 0 days.

(21) Appl. No.: 09/537,663

(22) Filed: Mar. 29, 2000

(30) Foreign Application Priority Data

Apr. 2, 1999 (IT) .......................................... VR99A0033

(51) Int. Cl.[7] .............................................. B60C 25/132
(52) U.S. Cl. ...................... 157/1.24; 157/1.28; 157/1.26
(58) Field of Search .............................. 157/1.17, 1.22, 157/1.24, 1.26, 1.28

(56) References Cited

U.S. PATENT DOCUMENTS

| | | | | |
|---|---|---|---|---|
| 4,047,553 A | * | 9/1977 | Kotila ........................ | 157/1.24 |
| 4,673,016 A | * | 6/1987 | Damman et al. ........... | 157/1.24 |
| 5,226,465 A | * | 7/1993 | Schon et al. ................ | 157/1.24 |
| 5,758,703 A | * | 6/1998 | Mimura ...................... | 157/1.24 |
| 5,980,083 A | * | 11/1999 | Patte et al. ................. | 157/1.26 |

* cited by examiner

*Primary Examiner*—Joseph J. Hail, III
*Assistant Examiner*—Lee Wilson
(74) *Attorney, Agent, or Firm*—Guido Modiano; Albert Josif; Daniel O'Byrne

(57) ABSTRACT

A tire changing machine having a support frame, rotatable supporting device for a wheel rim, locking device for securing the wheel rim to the supporting device, a fitting tool which can be secured to an adjustable tool supporting arm carried by the support frame, and driving device for the rotatatable supporting device. The machine also includes a first and a second pressure members which can be located in diametrically opposite positions with respect to a wheel rim carried by the supporting device and are designed to act on either side of a tire on the wheel rim, and drive device for actuating, upon control, each of the first and second pressure members.

15 Claims, 10 Drawing Sheets

TIRE CHANGING MACHINE FOR
INDUSTRIAL VEHICLE WHEELS

BACKGROUND OF THE INVENTION

The present invention relates to a tire changing machine for industrial vehicle wheels.

As it is known, despite considerable progress in recent decades in terms of automation of tire fitting, bead release and tire removing operations, fitting and removal of industrial vehicle tires still require considerable manual effort and great skill by the operator, who must intervene several times in a tire fitting or removal operation with the risk of injuring himself.

SUMMARY OF THE INVENTION

The main object of the present invention is to provide a new tire changing machine suitable for performing in a substantially automatic manner various operations including gripping a wheel rim-tire assembly or just the wheel rim, fixing it in position and fitting bead release and removing of the tire.

Another object of the present invention is to provide a tire changing machine which is of universal use for wheels of flanged-rim, inverted-channel or bead-wire type.

Another object of the present invention is to provide a new bead release or breaking away and removal method which is highly effective and fast to be carried out.

According to a first aspect of the present invention, there is provided a tire changing machine which has a support frame, rotatable supporting means for a wheel rim, locking means for securing said wheel rim to said supporting means, a fitting tool securable to an adjustable tool supporting arm carried by said support frame, and driving means for said rotatable supporting means, and is characterized in that it comprises at least one first and second pressure rollers which can be located in diametrically opposite positions with respect to a wheel rim carried by said supporting means and are arranged to act on either side of the wheel rim, and control means designed to act, upon control, on each said first and second rollers.

Advantageously, said supporting means comprises a flange-type mandrel assembly for supporting a wheel rim, said mandrel assembly is telescopic and arranged with its axis of rotation at a relatively small angle with respect to the horizontal, and can be raised and lowered in order to adapt to various wheel rim dimensions.

According to another aspect of the present invention, there is provided a method of releasing or breaking away the bead of a tire rigidly coupled to a rotating support and of removing said tire, said method being characterized in that it comprises:

applying to a tire at least one pair of bead releasing rollers which are arranged diametrically opposite to one another while acting on opposite sides on said tire;

rotating the tire while said bead releasing rollers apply mutually opposite but staggered pressures in order to break-away the bead of the tire on both sidewalls; and stopping the pressure action of one of the bead breaker rollers while the other one is still pressing against the tire until removal from the wheel rim is completed.

BRIEF DESCRIPTION OF THE DRAWINGS

Further aspects and advantages of the tire changing machine according to the present invention will become better apparent from the following detailed description of a few currently preferred embodiments thereof, illustrated only by way of non-limitative example with reference to the accompanying drawings, wherein.

DESCRIPTION OF THE PREFERRED EMBODIMENTS

Figure 9:
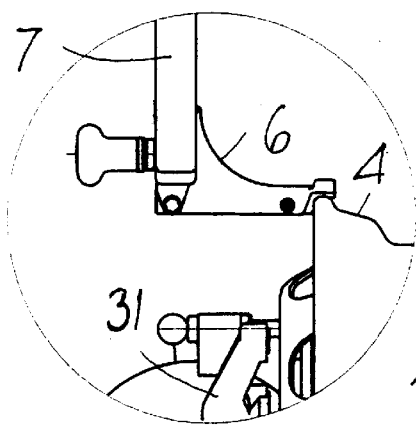
FIG. 9 is a view of a detail relating a tool of the machine of FIG. 1.

In the accompanying drawings, identical or similar parts or components have been designated by the same reference numerals.

With reference first to the above figures, it will be noted that a tire changing machine according to the invention, generally designated by the reference numeral 1, is constituted by: a support frame 2, a mandrel assembly 3 acting as a rotating support for a wheel rim 4, a fitting tool 6 securable to a tool supporting arm 7, which is adjustable in position and is supported by the support frame 2, a pair of rollers: a front one 8 and a rear one 9, which are arranged at diametrically opposite positions with respect to the wheel rim 4 when it is supported on the mandrel assembly 3, said rollers being arranged on opposite sides with respect to the wheel rim 4; and a hydraulic assembly 5 and a gearmotor assembly 26 for actuating the movable components of the machine.

The support frame 2, in the illustrated embodiment, comprises a base 2a which can be preferably fixed to the floor by means of lateral lugs 10 formed with an anchoring hole 11. A shaped platform 12 is provided at the front side of the base, and a wheel rim 4 or a wheel with a tire 13 on it located and held in position to a certain extent owing to a recess 12a which is substantially axially aligned with the mandrel assembly 3.

Two front uprights 14 and 15 and two rear uprights 16 and 17 extend upwards from the base 2a and are secured at the top thereof, to a stiffening frame 18.

Advantageously, the axis of the mandrel assembly 3 extends so as to form a relatively small angle, of the order of 15–30 degrees, with respect to the horizontal, i.e. its front end, which is adjacent to the front uprights 14 and 15, is at a higher level from the ground than its rear end. Moreover, in order to allow the mandrel assembly 3 to be adjusted to meet various sizes of the wheels and their respective wheel rims, the mandrel assembly can be raised and lowered along the front uprights 14 and 15, which are thus correspondingly inclined backward with respect to the vertical.

Figure 3:
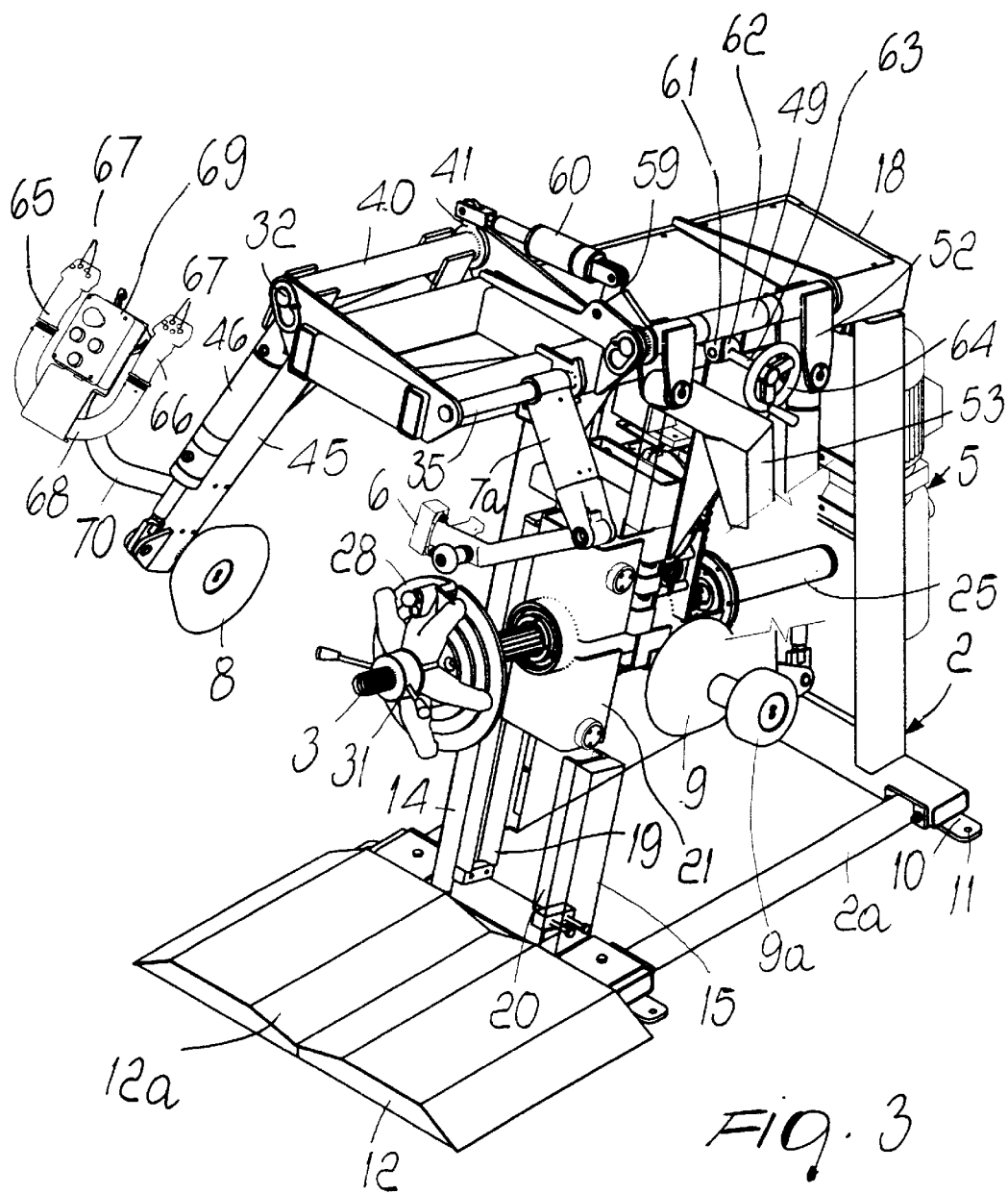
FIG. 3 is a perspective view of the machine of FIG. 1, with parts removed and with no wheel rim.
Figure 4:
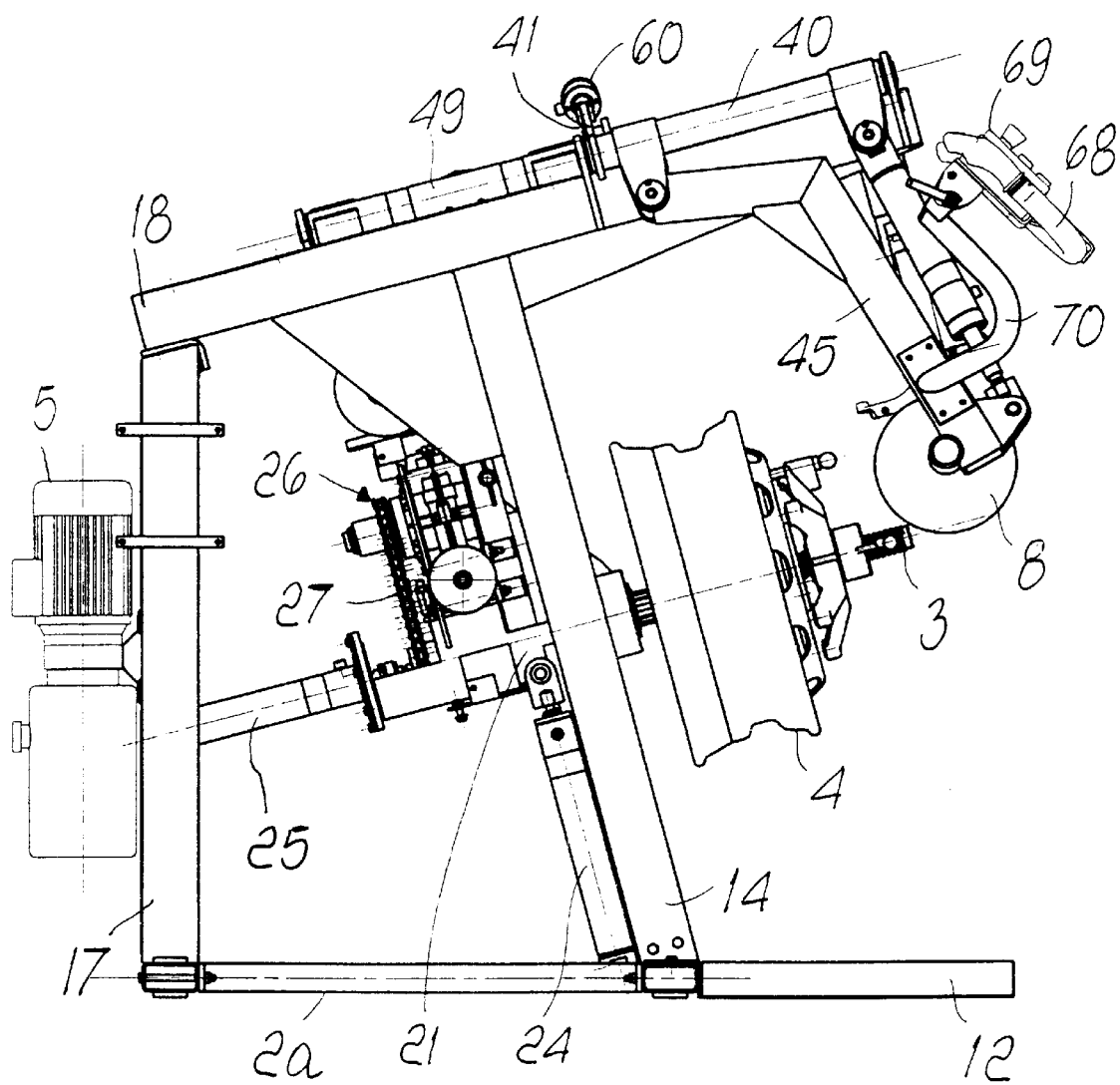
FIG. 4 is a side elevation view, with portions shown in cross-section taken from the opposite side with respect to that shown in FIG. 1.
Figure 5:
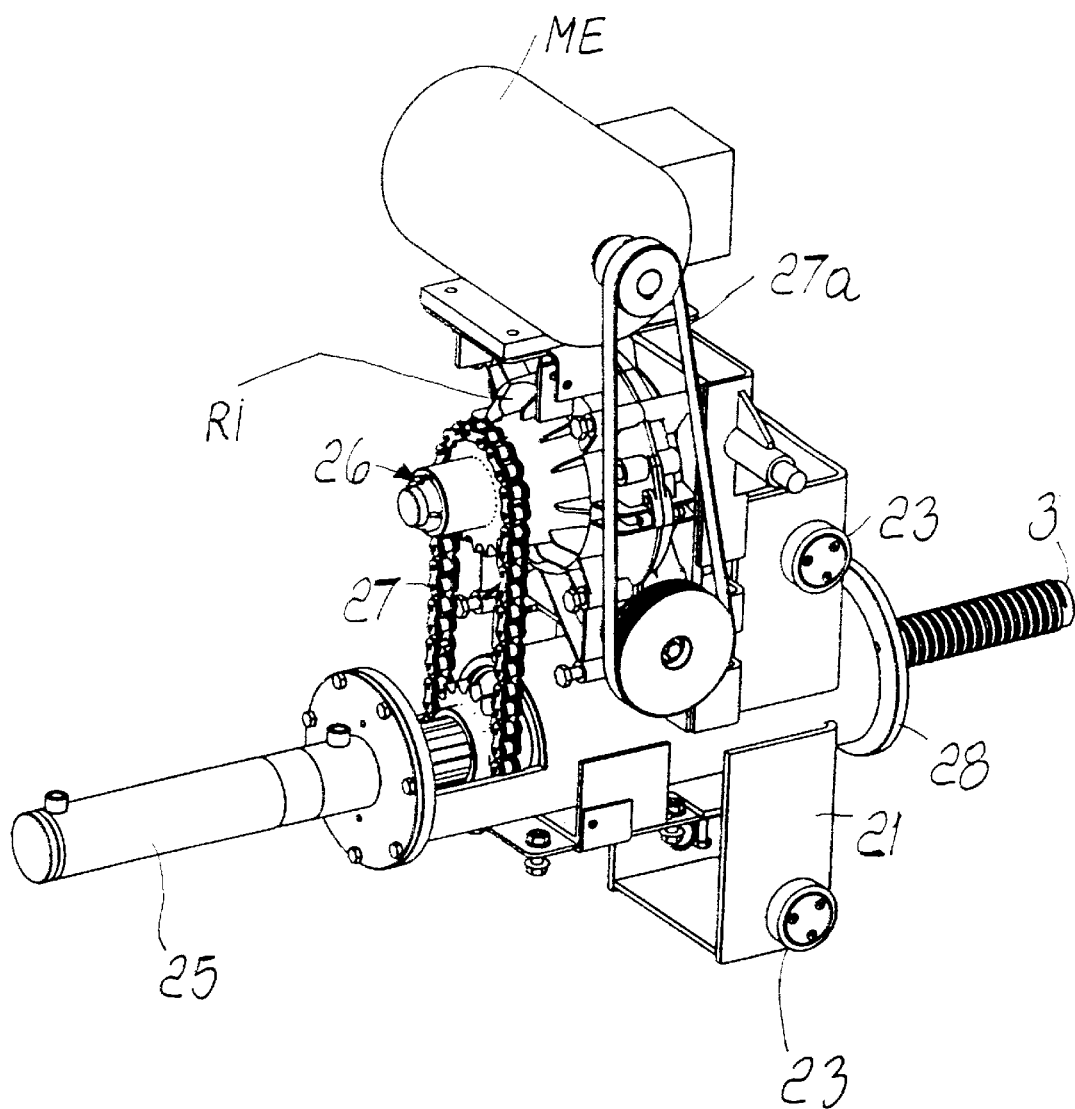
FIG. 5 is a perspective view of a mandrel and gearmotor assembly of the machine of FIG. 1.

To this purpose, along the internal side of each front upright 14 and 15 there are provided two mutually opposite and parallel guides 19 and 20, along which a slide or a carriage 21 provided with four sliding rollers 23 is slideably mounted (FIG. 3). The carriage 21 rotatably supports, e.g. by interposition of suitable bearings (not shown in the drawings), the mandrel assembly 3, which can also be raised and lowered owing to the action of a double-acting hydraulic jack 24 (FIG. 4) extending parallel to the front uprights and having one end thereof anchored to the base 2a and its other end connected to the slide 21.

The actual mandrel 3 is preferably of telescopic type and is controlled to extend or retract by a double-acting hydraulic jack 25 which is preferably coaxial to said mandrel, whereby the mandrel can extend forward or retract with respect to the front uprights 14 and 15 in order to adjust itself to different types of wheel rim 4, e.g. a flanged wheel rim or an inverted-channel rim or a multi-bead rim.

An assembly 26, including an electric motor ME and a reduction unit RI for the mandrel 3 is arranged between the front and rear uprights, comprises a chain drive 27 between the reduction unit and the mandrel and a belt drive 27a between the electric motor and the reduction unit, and can be of any suitable type, as is known to a person skilled in the art.

At its front end the mandrel 3 has a flange 28 having steps 29 (FIG. 3) for supporting a wheel rim 4, which must then be fixed onto the mandrel by means of a plate 31 which can be screwed onto the threaded front end of the mandrel.

Figure 12:
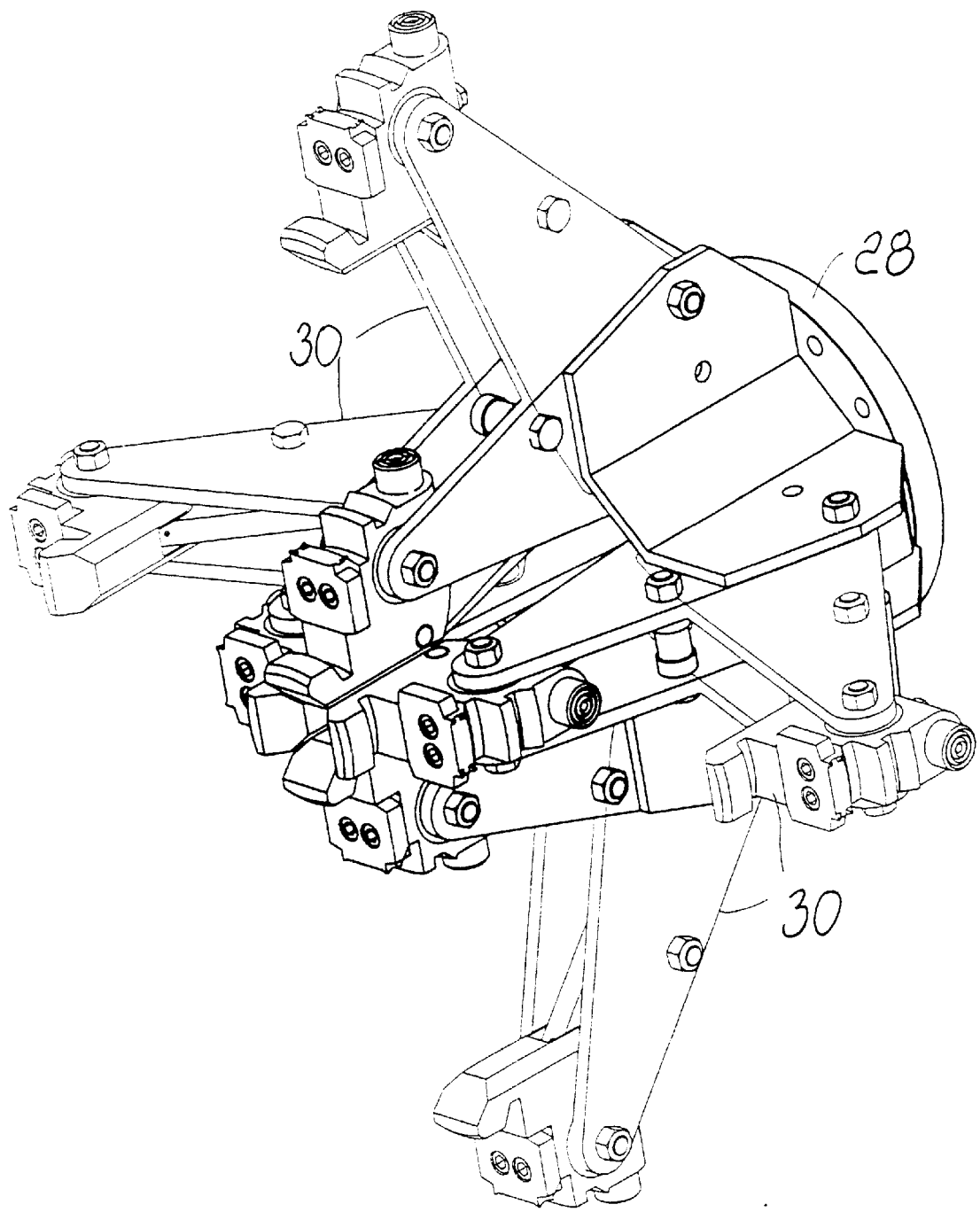
FIG. 12 is a perspective view of an expansion mandrel assembly for locking a wheel rim in its working position.

If desired, the flange 28 is provided with expanding arms 30 (FIG. 12) for engaging and locking the internal flange of the wheel rim 4.

The forward elongation of the mandrel 3 is utilized in combination with the possibility of moving up and down in order to adjust the mandrel to wheel rims 4 having different diameters, with or without a tire 13. Each wheel rim, in the case of a stepped flange 28 located on the platform 12, once it has been engaged at its central hole by the mandrel 3 inserted therein, is raised by the mandrel and, owing to the backward inclination of the mandrel, comes at rest against the flange 28 and is then rigidly secured to the mandrel by screwing onto it a locking plate 31.

More particularly, again owing to the inclination of the mandrel 3 with respect to the horizontal, the wheel rim 4, once it has been raised by the mandrel 3, cannot fall forward with respect to the machine, which would be dangerous for the operator, but is urged immediately to rest against the flange 28 even before being fixed in position by means of the plate 31, thus making the entire operation completely safe against accidents, which are not infrequent with conventional machines, since the wheel rims and wheel assemblies involved are usually of large dimensions and thus quite heavy.

Preferably, the frame 18 extends forward cantileverwise well beyond the front uprights 14 and 15 and supports, on the opposite side with respect to the longitudinal centerline of the machine, two rotating shafts 32 and 33 and a pivot 35, all of which extend parallel to the mandrel 3 and are, for example, supported by suitable brackets 36, 37, 38 and 39 (FIG. 6) which are welded to the frame 18. Shaft 32 is supported by the two brackets 36 and 37 and, in turn, supports a rotating sleeve 40 which is rigidly coupled, at its distal end, to a lug 41 which extends upward and is formed with a through hole 42.

Two forks 43 and 44 are fixed, e.g. welded, to the sleeve 40 and spaced from one another and extend downwards. One end of an L-shaped arm 45 is articulated to the fork 44, and at its other end a front roller 8, which is preferably substantially a truncated cone in shape, is cantileverwise mounted for rotation, whereas one end of a linear actuator, such as a pneumatic double-acting jack 46 is linked to the fork 43, the other end thereof being articulated to a transverse pivot 47 which is carried at the lower end of the arm 45, e.g. by means of two lugs 48 welded to said arm.

With this configuration, when the hydraulic jack 46 is being elongated, the arm 45, and thus the front roller 8, are caused to be retracted in a direction substantially parallel to the vertical plane containing the mandrel 3, whereas when said jack is being shortened the roller is pushed forward.

Similarly, the shaft 33 is supported by the pair of brackets 38 and 39 and, in turn, supports a rotating sleeve 49 which is rigidly coupled, at its proximal end, to a toothed sector 50. Two mutually spaced and downwards extending forks 51 and 52 are fixed, e.g. welded, to the sleeve 49. One end of an L-shaped arm 53 (FIG. 7) is articulated to the fork 51, whereas at its other end the rear roller 9, which is preferably substantially a truncated cone in shape, is cantileverwise mounted for rotation about an axis of rotation in common with a cylindrical roller 9a. One end of a linear actuator, e.g. a hydraulic double-acting jack 54, is linked to the fork 52, whereas the other end of said actuator is articulated to a transverse pivot 55 which is supported at the lower end of the arm 53, e.g. by means of two lugs 56 welded to said arm.

Figure 7:
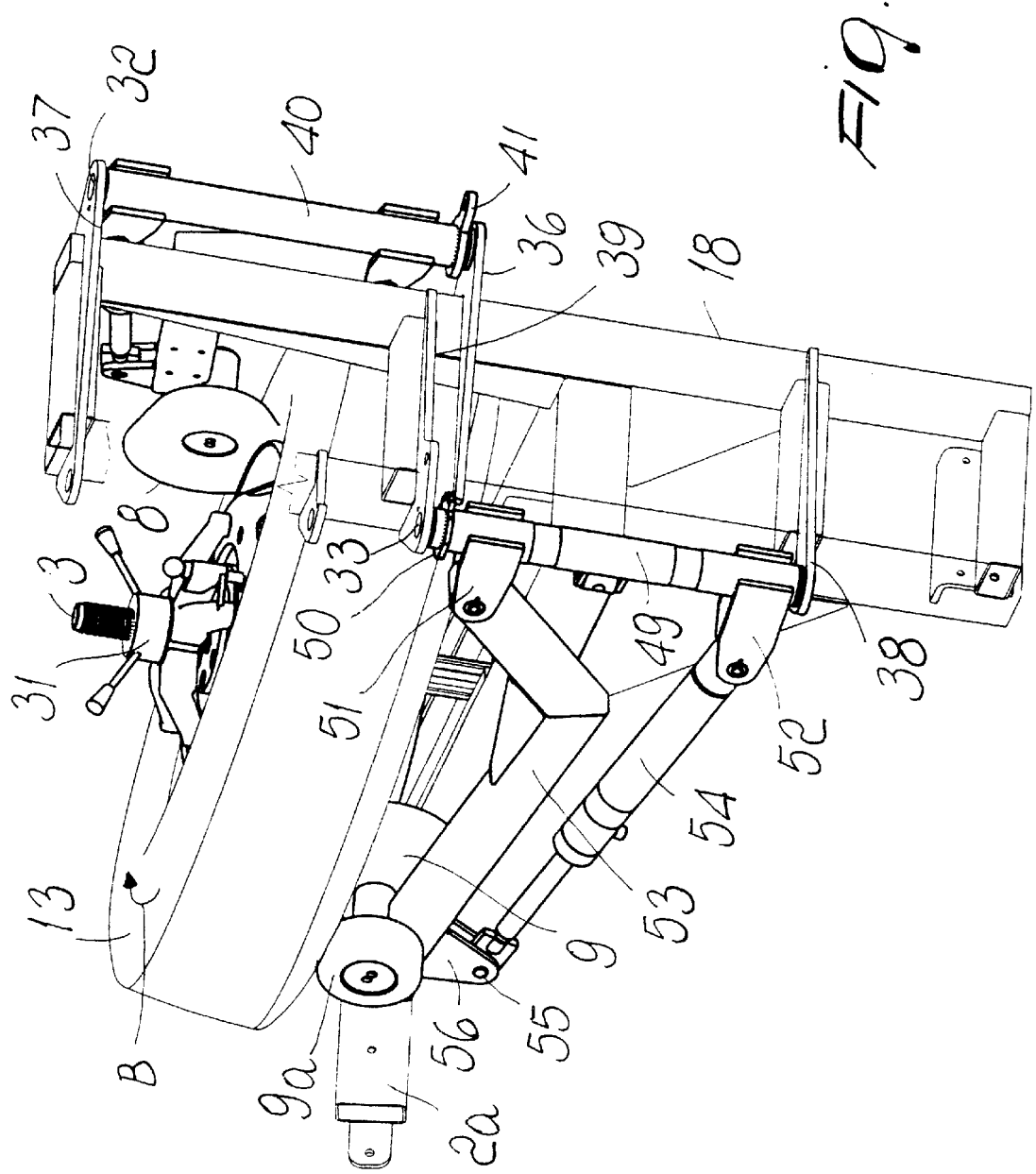
FIG. 7 is a top view, with parts cut away to illustrate a bead breaking and removal operation.
Figure 8:
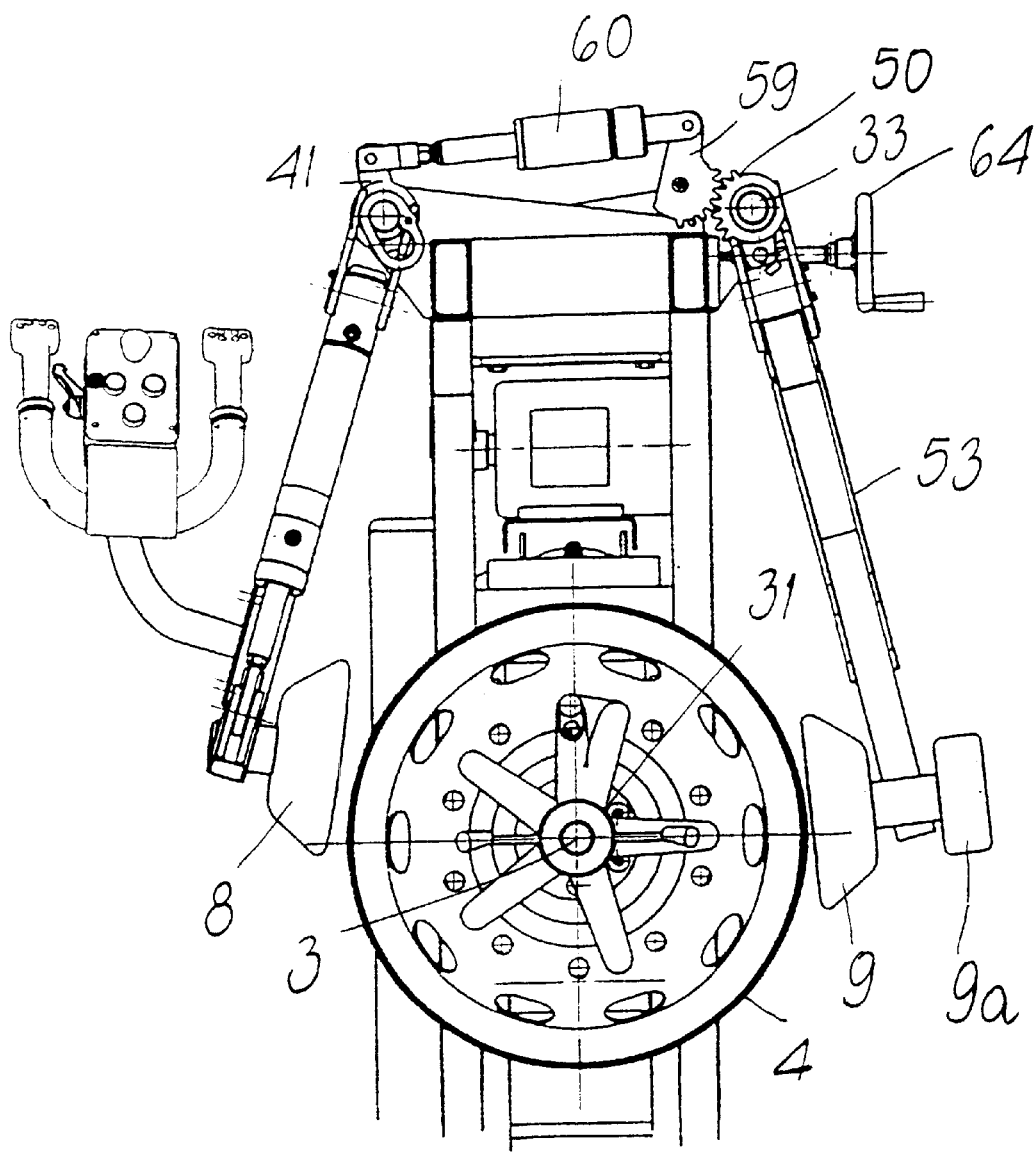
FIG. 8 is a partial front view, with parts shown in cross-section, of the machine of FIG. 1.
Figure 10:
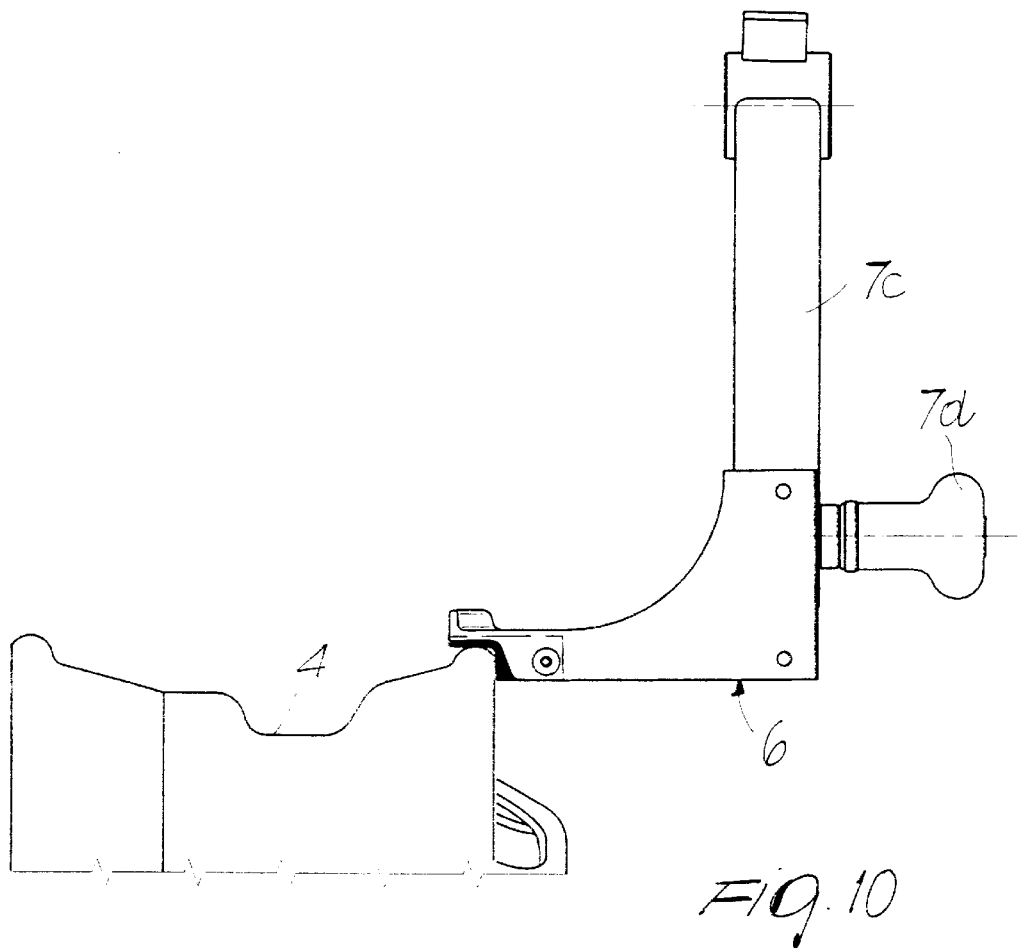
FIGS. 10 and 11 are a front elevation view and a plan view, respectively, of the tool of FIG. 9.
Figure 11:
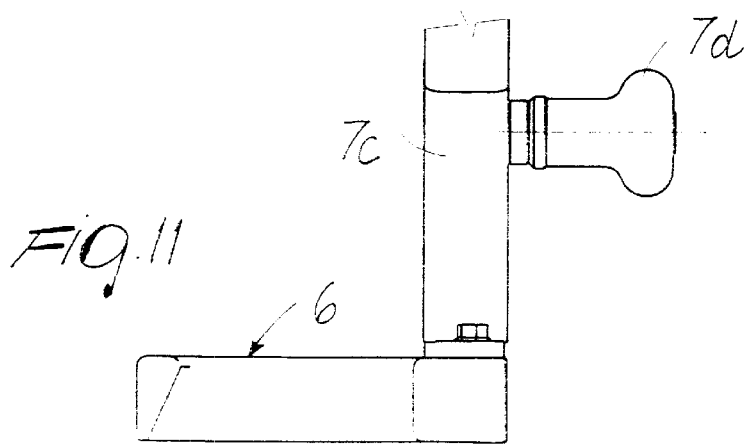

With this configuration, when the hydraulic jack 54 expands, the arm 53, and thus the rear roller 9, are pushed forwards in a direction substantially parallel to the vertical plane containing the mandrel 3, whereas when said jack contracts itself, the roller 9 is shifted backwards against the tire 13, as is better shown in FIG. 7.

Figure 2:
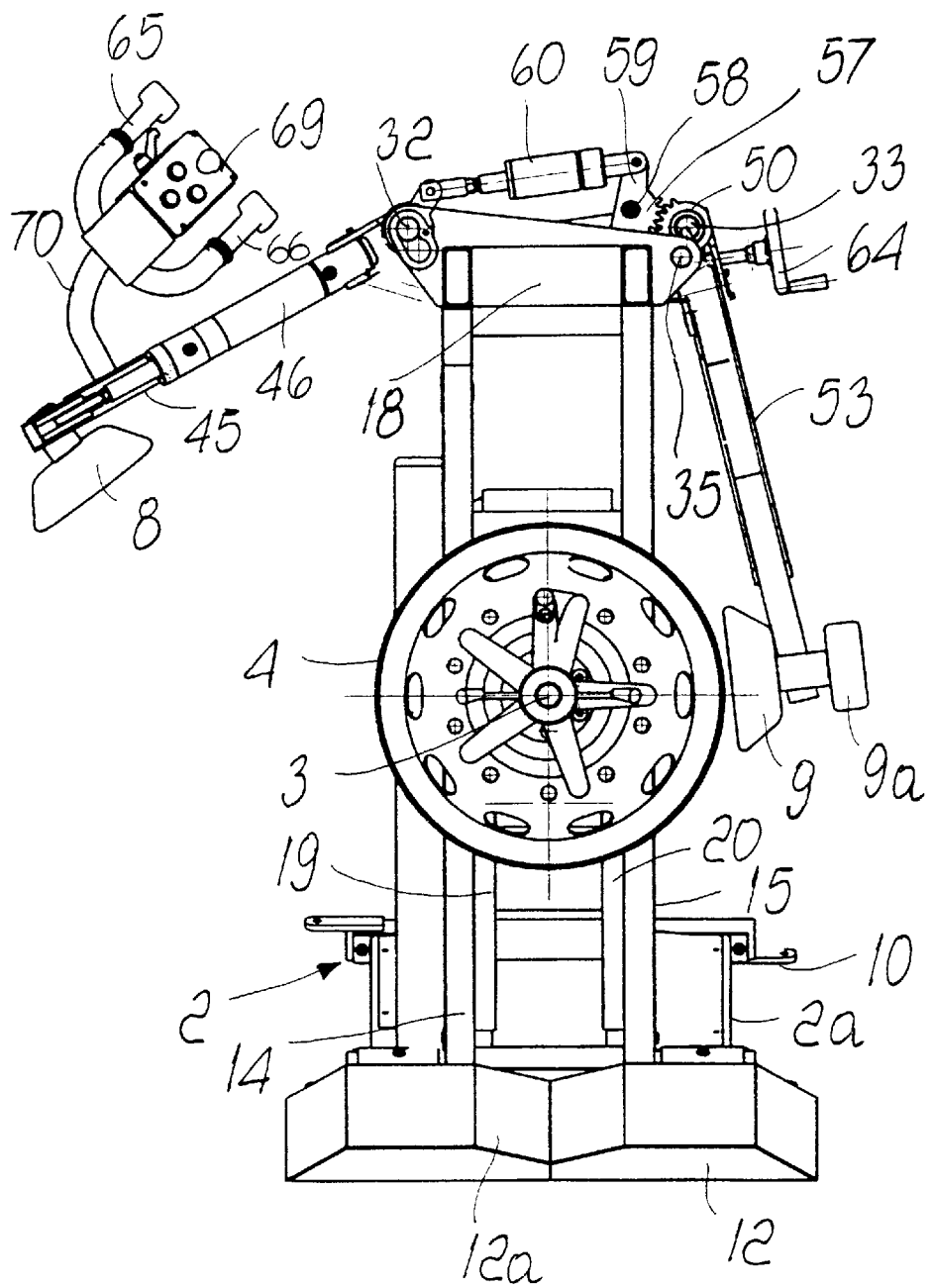
FIG. 2 is a front view of the machine of FIG. 1.

The toothed sector 50, rigid with the sleeve 49, meshes with a toothed sector 57 (FIGS. 2,3 and 7) which is pivoted at 58 to the frame 18 or to the bracket 39 and has an arm 59 which is linked to one end of a hydraulic double-acting jack 60 which is arranged above and astride the frame 18, the other end of said jack being linked to the lug 41 rigid with the sleeve 40 on the other side of the machine. Thus, when the jack 60 is being elongated, the two arms 45 and 53 are caused to move closer to one another near a respective side of the machine or the mandrel 3, whereas when said jack is being shortened, said arms, and thus their respective rollers carried on them, are moved mutually apart, i.e., moved away from the sides of the machine or from the mandrel 3.

As is more clearly shown in FIG. 3, two lugs 61 are secured, e.g. welded, to the sleeve 49 which extend downwards and support therebetween a nut or female thread 62 into which a threaded shaft 63 controlled by a handwheel 64 can be screwed. When the shaft 63 is screwed into the female thread 62, it will protrude from it to abut against the frame 18 and act as a retainer for the arm 53, which is then stopped while the jack 60 is being shortened, whereas, by reaction, the arm 45 can proceed, for a certain extent, with its stroke away from the mandrel 3, as further explained hereinafter.

Preferably, the front arm 45 (FIGS. 1 to 4) supports, also in a forward position quite comfortable for an operator, two knobs 65 and 66 which are provided with control buttons 67 and supported, e.g. by a U-shaped support 68 which, in turn, carries a control panel 69 and is supported at one end of a cantilever arm 70 whose other end is fixed to the arm 45.

The fitting tool 6 can be arranged at the free end of the tool holder arm 7, whose other end is articulated to the pivot 35 so that it can perform forward and backward sliding strokes in order to adapt itself to various widths of wheel rims 4. More particularly, the arm 7 (FIG. 6) is formed by a first section 7a which is linked, at one end thereof to the pivot 35 and terminates, at its other end, with a fork 7b, to which one end of a second section 7c, is pivoted, which is e.g. L-shaped and provided with a control knob 7d. The arm 7 thus structured allows the tool 6 to be moved, as shown more clearly in FIG. 1, to a working position which is offset by approximately 90 degrees with respect to the working position of the roller 8 and on the same side with respect to a wheel rim 4 fitted on the mandrel assembly 3 but on the opposite side with respect to the rear roller 9.

On its part designed to contact the edge of the wheel rim 4, the tool 6 is coated with, or has otherwise applied thereto, a layer of a suitable, tough, self-lubricating plastic material, e.g. nylon (registered ™) reinforced with glass fiber, thereby avoiding deforming or otherwise damaging the wheel rim 4.

The operation of the above-described tire changing machine is as follows.

A distinction should be made between two main operations, namely mounting of a tire and bead breaking and removal of an already-mounted tire.

Figure 1:
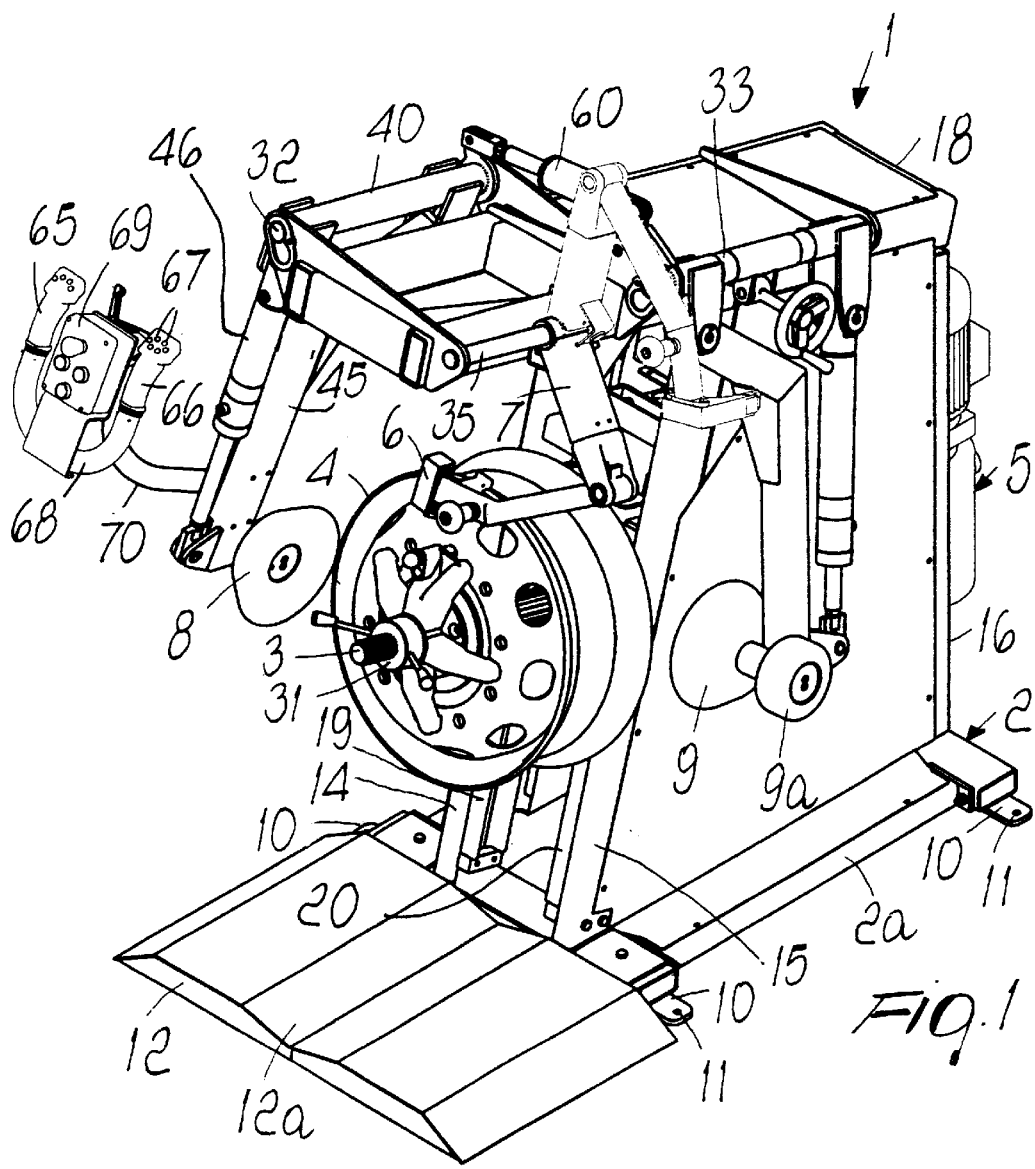
FIG. 1 is a perspective view slightly from above of a tire changing machine according to the invention.
Figure 6:
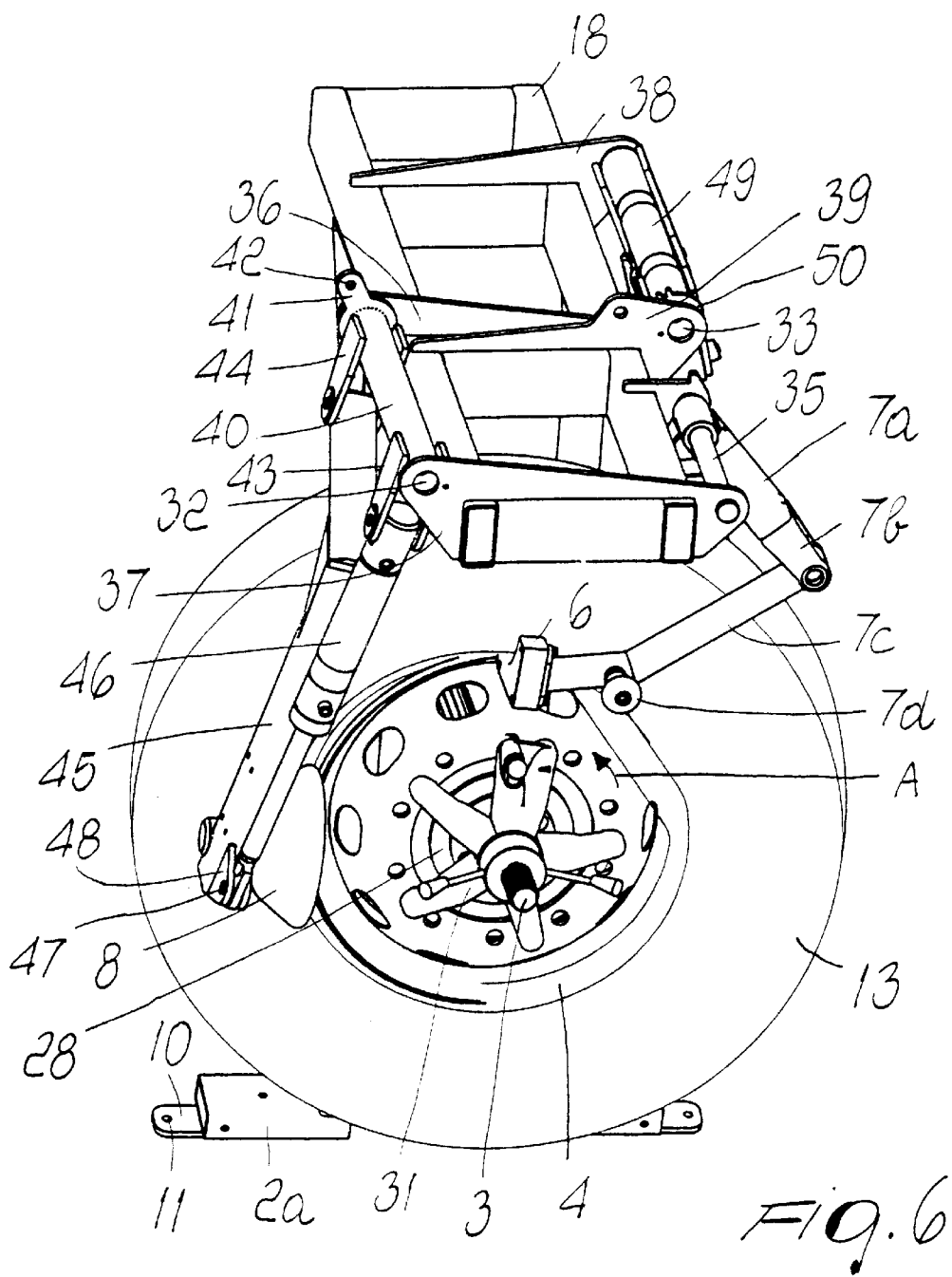
FIG. 6 is a front view slightly from above, with parts cut away, illustrating a fitting operation of the machine of FIG. 1.

For a tire mounting operation, the tool 6 and the front roller 8 are used as shown in FIGS. 1 and 6. It will be noted that tool 6 is angularly spaced from the working position of the roller 8 of about 90 degrees. The wheel rim 4 is located in position by causing it to roll or by placing it in the recess 12a of the platform 12. The operator, by acting on the buttons 67 of the knobs 65 and 66, controls by following a suitable control sequence the jacks 24 and 25, thereby causing the mandrel 3 to be lowered or raised to the level of the central hole in the wheel rim 4 located on the platform 12 and inserted into it to positively engage it. The mandrel 3 is then raised and the wheel rim 4 is lifted with it, so that the wheel rim, owing to the inclination of the mandrel with respect to the horizontal, rests against the flange 28 and is lifted.

The operator then locks the wheel rim on the mandrel assembly by screwing the plate 31 onto the mandrel, thus clamping the wheel rim 4 against the flange 28 so that it becomes rigid in rotation with the mandrel.

A tire 13 is then drawn near to the wheel rim and rests with its bead on it. The mandrel assembly is further lifted, together with the tire, until the tire 13 is raised above the platform 12. By acting on controls 67, the front roller 8 is then located in such a way as to push the tire 13 (FIG. 6) beyond the edge of the wheel rim 4. The tool 6 is then located in its working position by acting on the knob 7d, at 90 degrees with respect to the roller 8 and by inserting the tip of the tool between the edge of the wheel rim and the bead of the tire 13.

The operator by energizing electric motor ME sets then the mandrel in rotation in the direction of the arrow A in FIG. 6. Simultaneous combined action of the roller 8, which presses against the sidewall of the tire 13 to push it inwards, i.e., toward the flange 28, and of the tool 6, which causes the tire bead to move to the inside edge of the wheel rim, results in a rapid mounting of the tire 13 onto the wheel rim 4.

For a bead breaking or release and removal operation, reference should be made in particular to FIG. 7, which shows two rollers, i.e., front roller 8 and rear roller 9, being used. The said rollers are arranged in diametrically opposite working positions on opposite sides with respect to the tire 13 to be removed. In other words, one roller acts on the front sidewall and the other roller acts on the rear sidewall of the tire, thus applying a powerful and effective unseating action onto the tire. It will be noted, in this regard, that the wheel rim with the tire is caused to rotate in the direction of arrow B, and that the roller 9a assists the action of the mainly bead-breaking roller 9 by applying pressure in a region which is at a diametrically larger distance from, and therefore more effective on, the sidewall of the tire, thereby forcing it to come out of the wheel rim 4.

Once removal has been completed, the mandrel 3 is lowered in order to move away the removed tire from the wheel rim which is then ready to possibly receive another tire to be mounted onto it.

The disclosures in Italian Patent Application No. VR99A000033 from which this application claims priority are incorporated herein by reference.

What is claimed is:

1. A tire changing machine having a support frame, rotatable supporting means for a wheel rim, locking means for securing said wheel rim to said supporting means, a fitting tool securable to an adjustable tool supporting arm carried by said support frame, and driving means for said rotatable supporting means, and wherein it has at least one first and second pressure members which can be located in diametrically opposite positions with respect to a wheel rim carried on said supporting means and are arranged to act on opposite sides of a tire on said wheel rim, and drive means for actuating, upon control, each said first and second pressure members.

2. The machine according to claim 1, wherein said supporting means comprise a rotatable mandrel assembly.

3. The machine according to claim 2, wherein said rotatable mandrel assembly extends at an angle of 10 to 45 degrees with respect to the horizontal.

4. The machine according to claim 2, wherein said mandrel assembly is telescopic and comprises an actuation means arranged to cause, upon control, said mandrel assembly to extend and to shorten.

5. The machine according to claim 4, wherein said mandrel assembly is liftable and lowerable to adapt to various dimensions of wheel rims and is provided with lifting and lowering means which can be energized upon control.

6. The machine according to claim 4, wherein said mandrel assembly comprises a supporting flange for a wheel rim.

7. The machine according to claim 6, wherein said mandrel assembly comprises an expanding-arm assembly for engaging a wheel rim.

8. The machine according to claim 1, wherein said first and second pressure members comprise at least one roller mounted for rotation at one end of a respective supporting arm, the other end of which is linked to said support frame whereby it can oscillate to perform angular movements towards and away from said rotatable wheel rim supporting means upon energization of said drive means.

9. The machine according to claim 8, wherein said drive means comprise a linear actuator having one end which is articulated to said supporting frame and having another end which is pivoted to an end of a respective support arm carrying a pressure roller.

10. The machine according to claim 8, comprising a linear actuator to arranged between said first and second arms to control the angular distance of at least one of said arms with respect to said supporting frame between a working position and a rest position thereof.

11. The machine according to claim 10, wherein at least one of said arms is provided with a retainer to prevent any angular motion thereof.

12. The machine according to claim 11, wherein said retainer is controllable by a handwheel.

13. The machine according to claim 8, wherein said fitting tool is arranged, in use, at an angle of approximately 90 degrees with respect to at least of one roller.

14. A tire changing machine having a support frame, rotatable supporting means for a wheel rim, locking means for securing said wheel rim to said supporting means, a fitting tool securable to an adjustable tool supporting arm carried by said support frame, and driving means for said rotatable supporting means, and wherein it has at least one first and second pressure members which can be located in diametrically opposite positions with respect to a wheel rim carried on said supporting means and are arranged to act on either side of a tire on said wheel rim, and drive means for actuating, upon control, each said first and second pressure members, said supporting means comprising a rotatable mandrel assembly, and said rotatable mandrel assembly having a substantially horizontal axis.

15. A method for bead breaking and removing a tire secured to a rotating support from a wheel rim, comprising:

applying to said tire at least one pair of head breaking pressure members arranged diametrically opposite to, but acting on opposite sides of, the tire;

causing the tire to rotate while said bead breaking pressure members press onto mutually opposite and offset positions of said tire faces whereby breaking each tire bead simultaneously on both sidewalls or faces thereof; and turning off any pressing action of one of said bead breaking pressure members while the other one goes on pushing against the tire until removal from said wheel rim is completed.

* * * * *